(12) United States Patent
Lemort et al.

(10) Patent No.: US 8,390,577 B2
(45) Date of Patent: Mar. 5, 2013

(54) CONTINUOUS RECOGNITION OF MULTI-TOUCH GESTURES

(75) Inventors: Alexandre Lemort, Toulouse (FR); Stéphane Vales, Toulouse (FR)

(73) Assignee: Intuilab, Labege (FR)

( * ) Notice: Subject to any disclaimer, the term of this patent is extended or adjusted under 35 U.S.C. 154(b) by 1012 days.

(21) Appl. No.: 12/342,843

(22) Filed: Dec. 23, 2008

(65) Prior Publication Data

US 2010/0020025 A1 Jan. 28, 2010

Related U.S. Application Data

(60) Provisional application No. 61/083,681, filed on Jul. 25, 2008.

(51) Int. Cl.
*G06F 3/041* (2006.01)

(52) U.S. Cl. .................................................. 345/173

(58) Field of Classification Search .................. None
See application file for complete search history.

(56) References Cited

U.S. PATENT DOCUMENTS

| | | | |
|---|---|---|---|
| 6,498,590 B1 * | 12/2002 | Dietz et al. | 343/893 |
| 7,030,861 B1 * | 4/2006 | Westerman et al. | 345/173 |
| 7,463,270 B2 * | 12/2008 | Vale et al. | 345/619 |
| 7,719,523 B2 * | 5/2010 | Hillis | 345/173 |
| 7,976,372 B2 * | 7/2011 | Baerlocher et al. | 463/12 |
| 2008/0036743 A1 | 2/2008 | Westerman et al. | |
| 2008/0165255 A1 | 7/2008 | Christie et al. | |
| 2010/0285881 A1 * | 11/2010 | Bilow | 463/37 |
| 2011/0134047 A1 * | 6/2011 | Wigdor et al. | 345/173 |

FOREIGN PATENT DOCUMENTS

EP 1942401 A1 7/2008

OTHER PUBLICATIONS

Rekimoto et al: "Smartskin: An Infrastructure for Freehand Manipulation on Interactive Surfaces", CHI 2002 Conference Proceedings on Human Factors in Computing Systems. Apr. 20, 2002, vol. 4, No. 1, pp. 113-120, XP001099406.
European Search Report, dated Jul. 18, 2011, in Application No. EP 09 16 6376.

* cited by examiner

*Primary Examiner* — K. Wong
(74) *Attorney, Agent, or Firm* — Young & Thompson

(57) ABSTRACT

The present invention extends to methods, systems, and computer program products for processing multi-touch inputs. It provides a method for continuous recognition of multi-touch gestures performed by one or more users on at least one multi-touch input device. The invention in one aspect allows users to start interacting with one multi-gesture and subsequently perform any other multi-touch gestures, if they want it, without needing to lift all their fingers off the multi-touch input device between each multi-touch gesture.

22 Claims, 8 Drawing Sheets

Systems layers with at least one multi-touch input device

Spatial segmentation of contact points by application

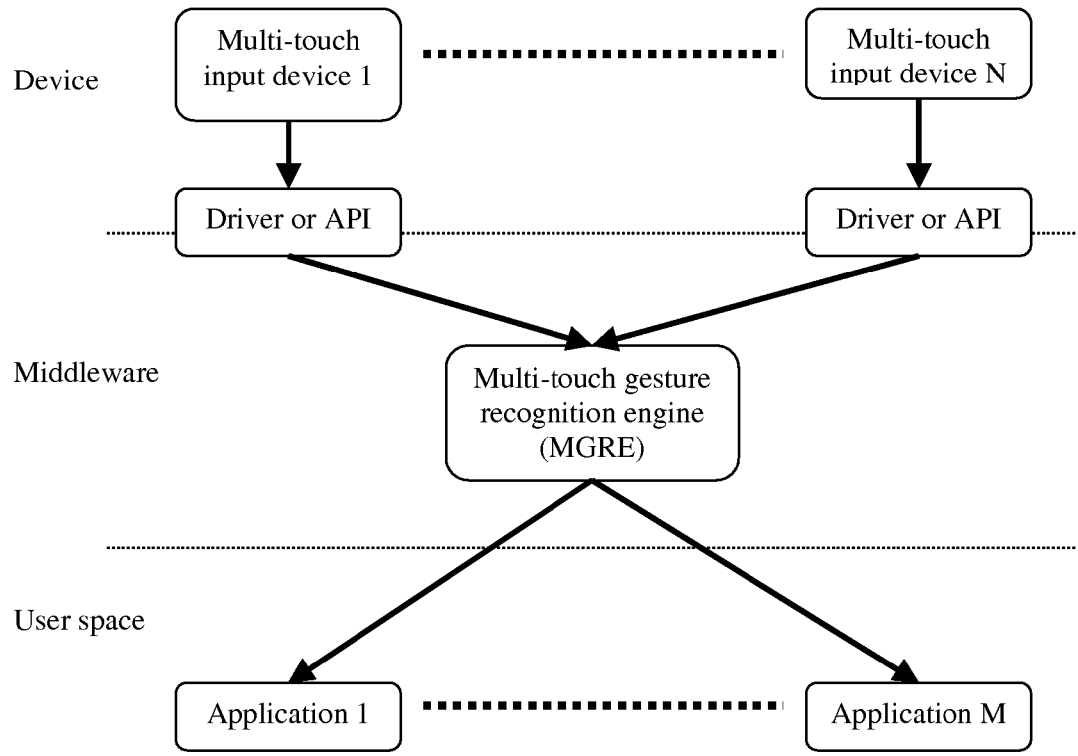
Figure 1: Systems layers with at least one multi-touch input device
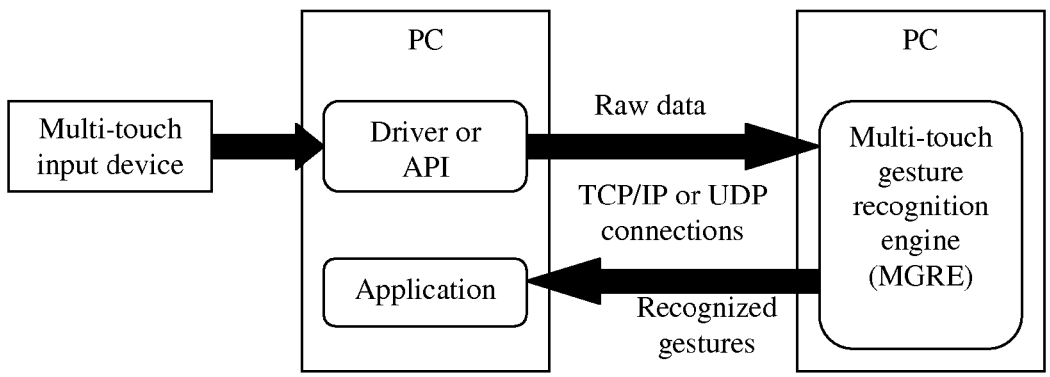
Figure 2: Example of distributed architecture

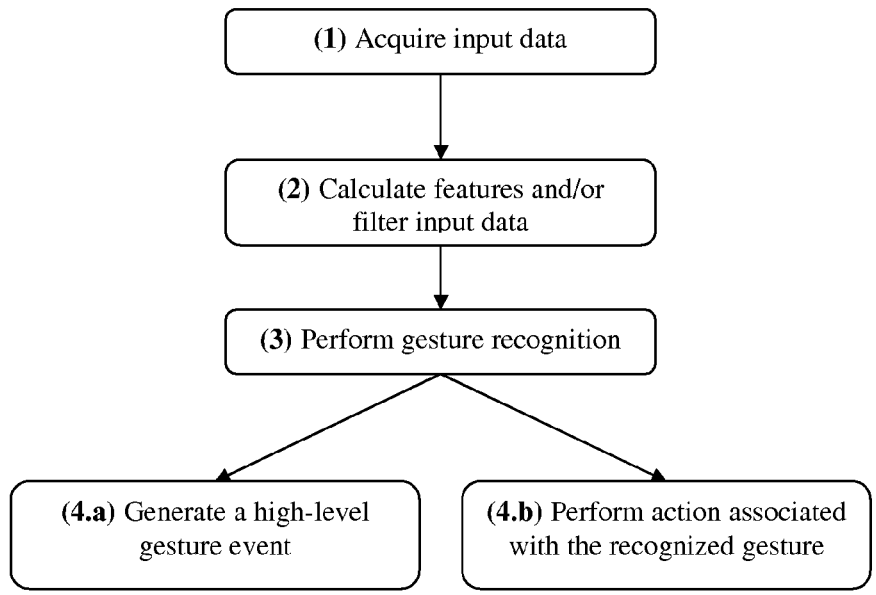
Figure 3: Multi-touch gesture recognition pipeline
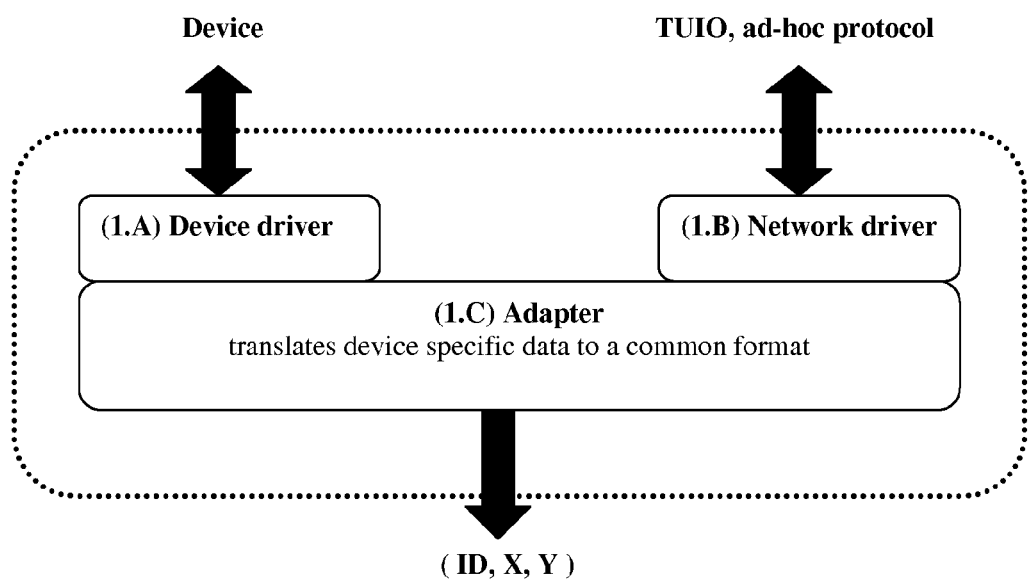
Figure 4: Acquiring input data

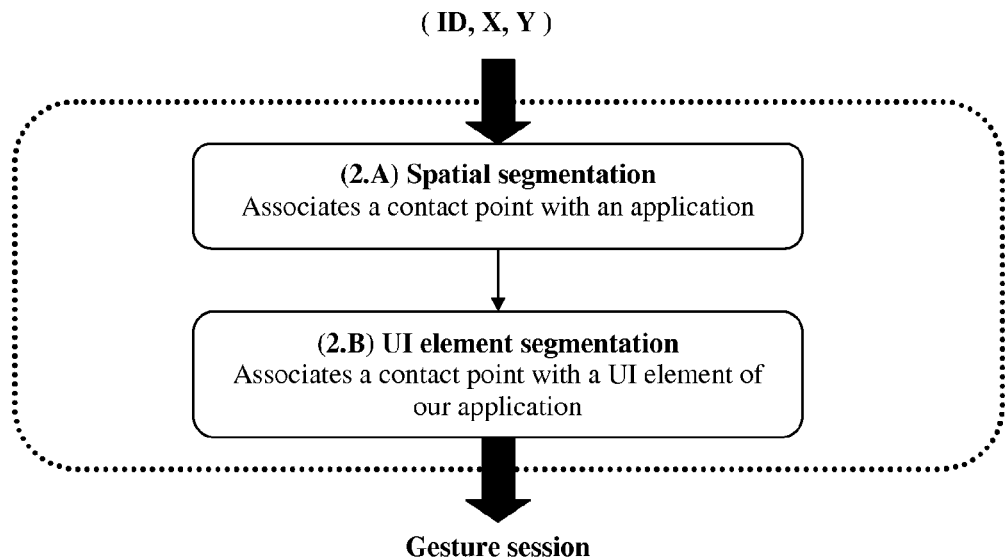
Figure 5: Filtering input data
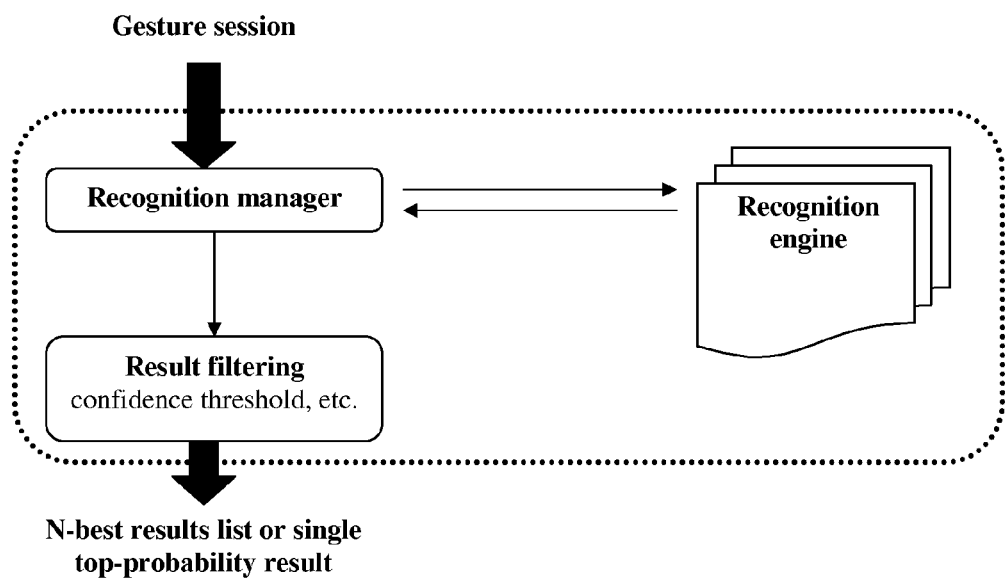
Figure 6: Interpreting input data as gestures

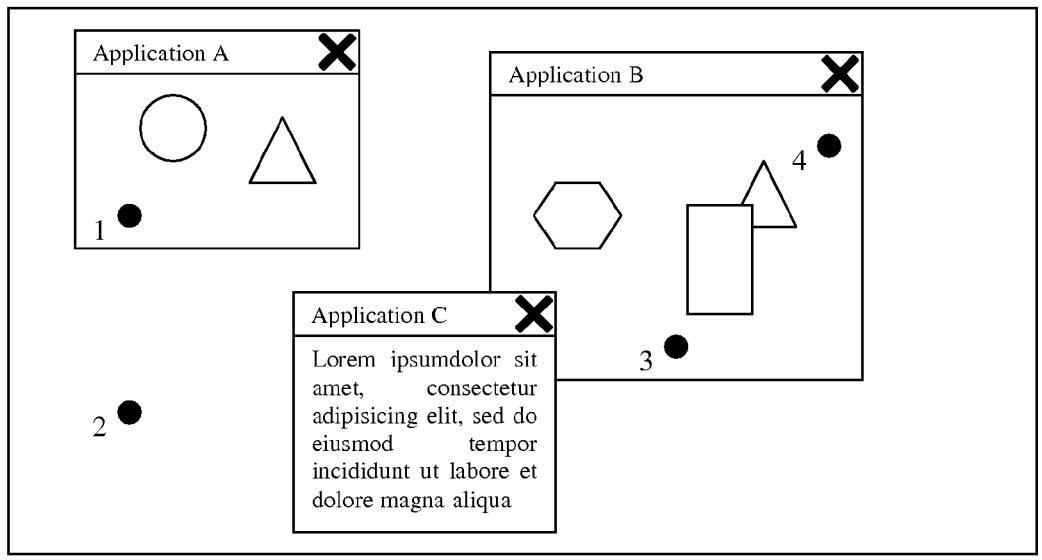
Figure 7: Spatial segmentation of contact points by application
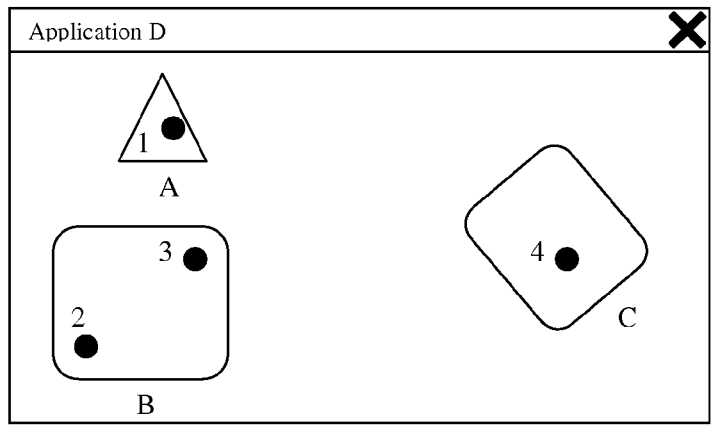
Figure 8: Segmentation of contact points by user interface element
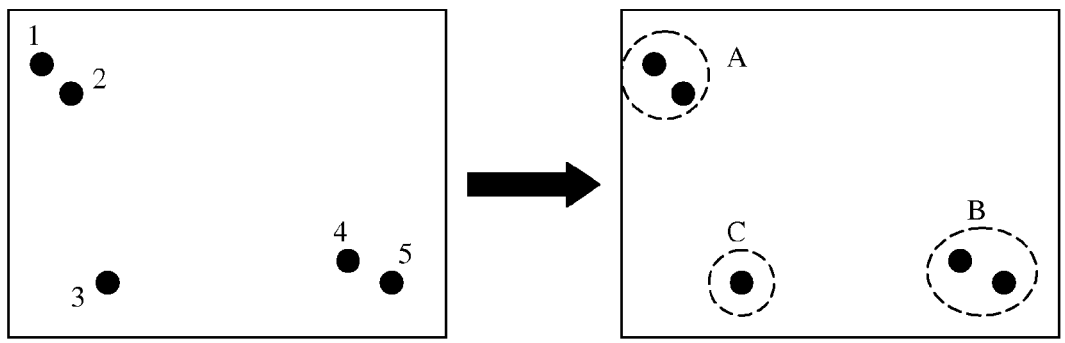
Figure 9: Spatial segmentation of contact points by distance

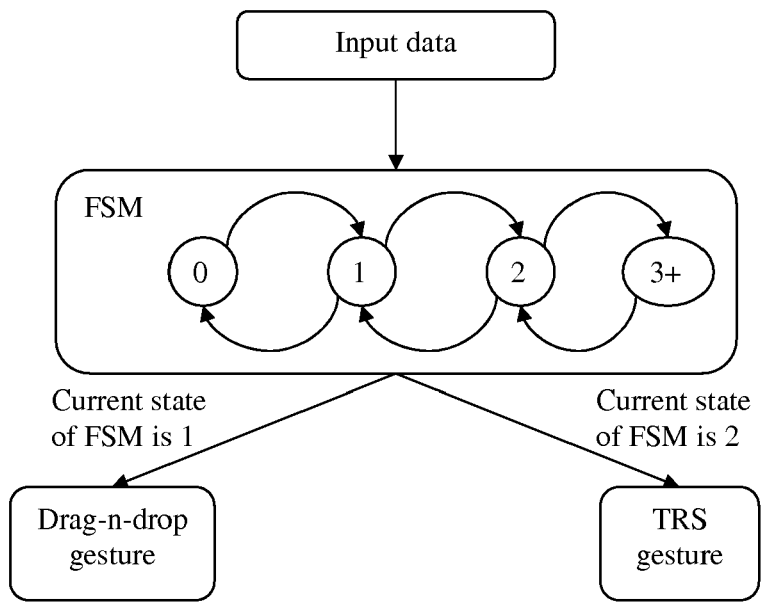
Figure 10: Using FSM to control the continuum of gestures
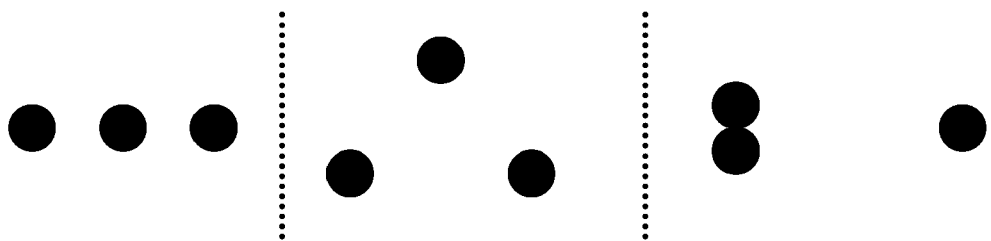
Figure 11: Examples of postures with three fingers
Figure 12: Zoom with two fingers / pinch gesture

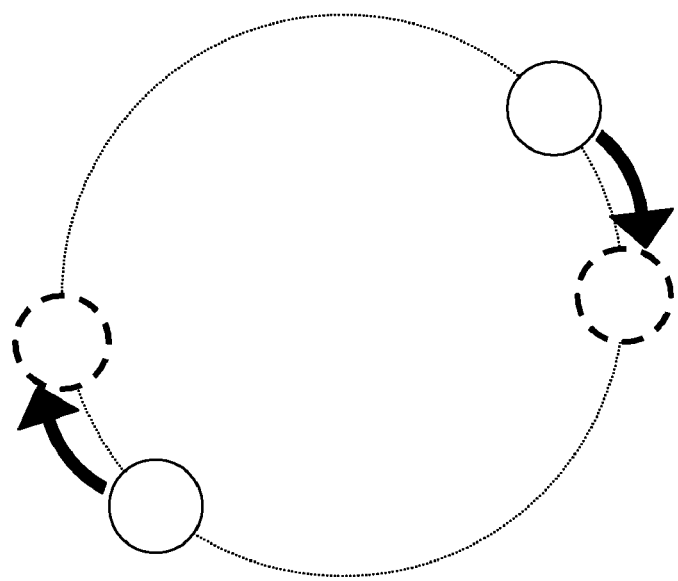
Figure 13: Rotation with two fingers
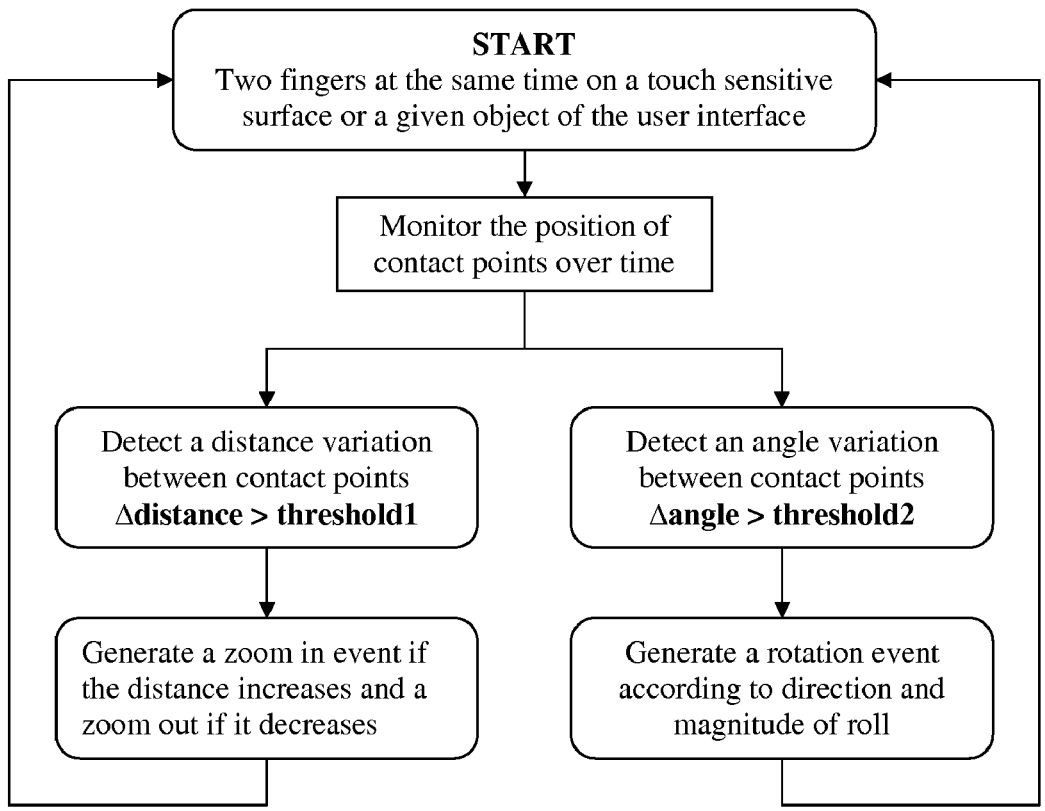
Figure 14: Continuous gesture recognition with transitions between gestures

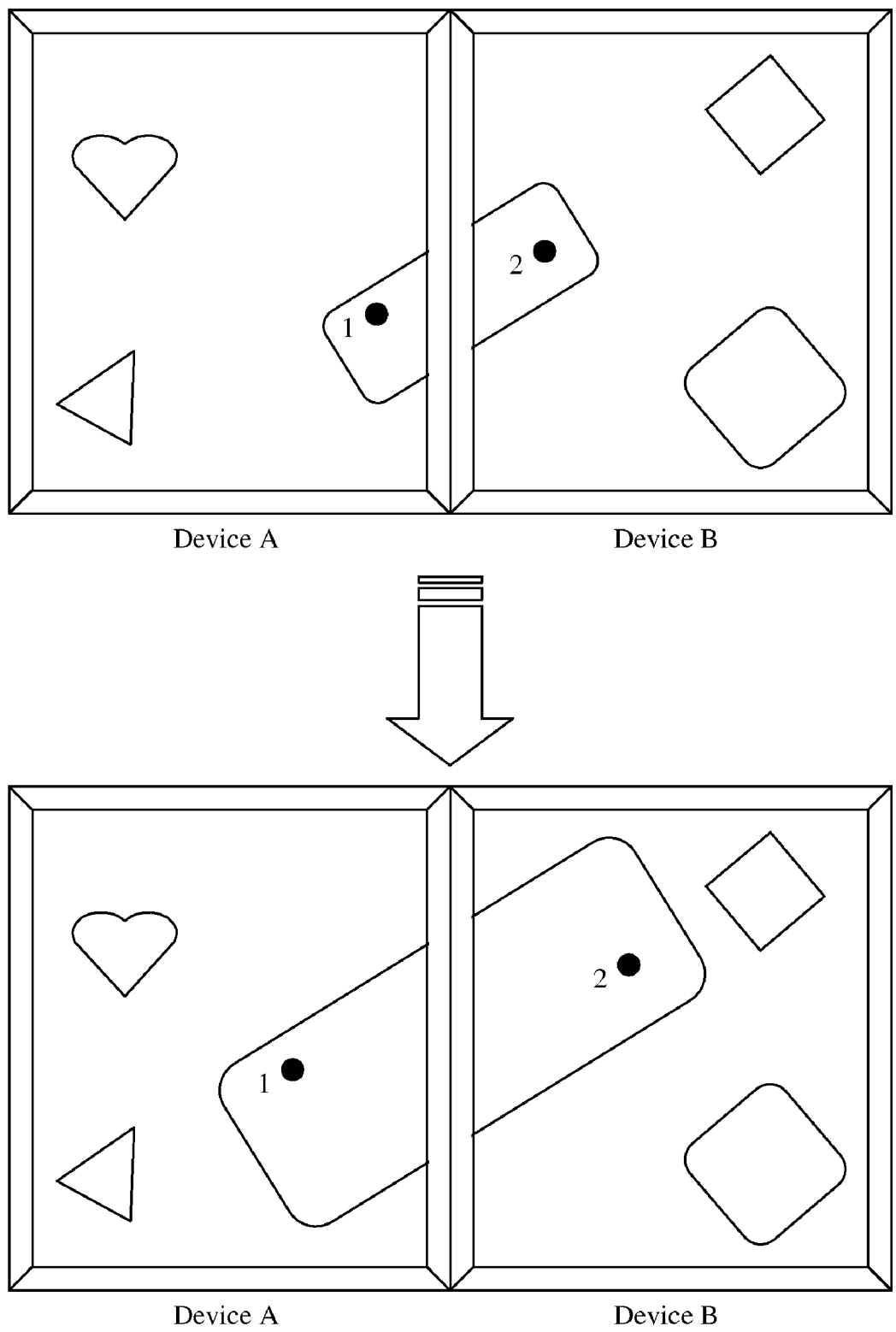
Figure 15: Performing a gesture on a UI element displayed on two multi-touch devices at once

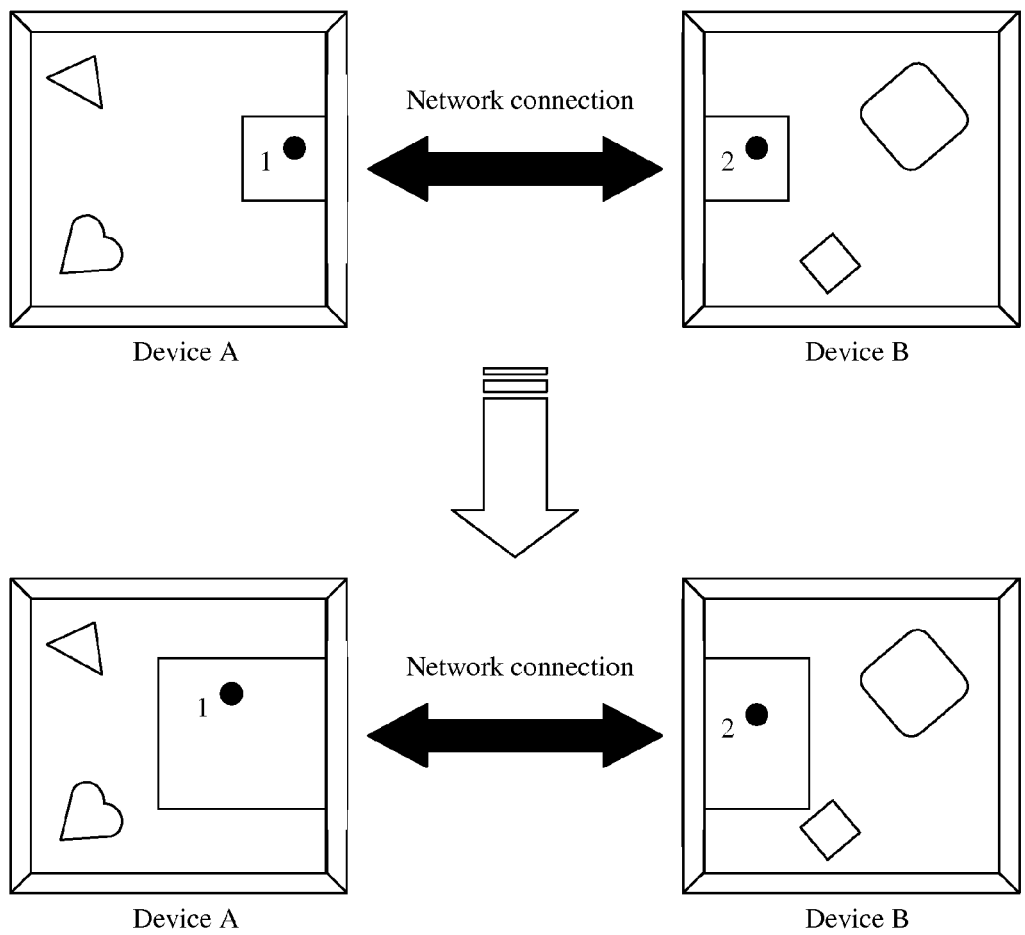
Figure 16: Performing a gesture on a graphical object displayed on two remote multi-touch devices at once

CONTINUOUS RECOGNITION OF MULTI-TOUCH GESTURES

CROSS-REFERENCE TO RELATED APPLICATIONS

This application claims priority to U.S. Provisional Patent Application No. 61/083,681, filed Jul. 25, 2008, the disclosure of which is incorporated herein by reference.

BACKGROUND OF THE INVENTION

1. Field of the Invention

The present invention relates generally to gesture recognition (GR), and more particularly to a method for implementing a continuous recognition of multi-touch gestures with multi-touch (MT) input devices.

2. Description of the Related Art

Most of modern computer systems (PC, Smartphones, etc) provide a similar core set of user interface commands, like drag-and-drop or cut-and-paste, that can be invoked using a mouse interaction (right-click, button, menu, etc) or keyboard shortcuts that are standardized across applications and partially across operating systems. Attempts to replace keyboard shortcuts with more natural interaction have led to gesture or handwriting recognizers (Graffiti alphabet, Microsoft Tablet PC Ink, etc) that activate these commands in response to glyphs drawn with a mouse, a pen or a finger. These recognizers have become commonplace in computer systems equipped with a stylus: PDA, smartphone/Pocket PC and tablet PC.

Over the last decades, there has been considerable interest in developing a new class of interactive devices, well-known as multi-touch devices an also referred as surface computing, which enable users to interact with computer systems in more natural ways, with a wider variety of interactions, than the more conventional input devices, such as keyboards, mice or simple touch screens. In 1984, Bell Labs was granted a patent for a touch-sensitive display with multi-touch capabilities (U.S. Pat. No. 4,484,179, filed in Dec. 23, 1981) and Lee S., University of Toronto, Canada, first implemented a capacitive sensor array capable of tracking multiple contact points simultaneously (Lee S., "A Fast Multiple-Touch Sensitive Input Device", M.A.Sc Thesis, Department of Electrical Engineering, University of Toronto, 1984). In 1991, Dean Rubine demonstrated a multi-touch version of his GDP (gesture-based drawing program) application, called MDP (Multi-finger drawing program), at SIGGRAPH 1991 ("Specifying gestures by example", Proceeding of the 18th Annual Conference on Computer Graphics and interactive Techniques SIGGRAPH'91. ACM Press, New York, N.Y., 329-337) using the Sensor Frame, a multi-touch input device invented by Paul McAvinney, University of Carnegie Mellon, that could detect up to three fingers. The MDP application illustrated a set of multi-touch gestures such as two fingers pinch gesture, two fingers rotate gesture or three fingers undo gesture i.e. three parallel Z (Rubine D., "The Autoimatic Recognition of Gestures", PhD Thesis, Carnegie-Mellon University, 1991). In 1992 SUN Microsystems released a concept movie of their vision of future computing in 2004, produced by Bruce Tognazinni, called "STARFIRE" showcasing a multi-touch gesture based user interface. This video is said to have inspired significant research in the area of multi-touch interaction, especially at corporate research labs such as Microsoft Research.

Gesture recognition methods have been identified in the art as being extremely valuable in the regard of multi-touch interaction. The availability of multi-touch input devices opens up the possibilities for new innovative gestures using multiple fingers which can be more intuitive and efficient through their proximity to actions used to manipulate everyday objects. Indeed, learning a small set of hand gestures for direct manipulation is/seems much easier than learning a slew of keyboard shortcuts.

Recently, multi-touch input devices have become more widespread thanks to advancements in the area of touch sensing technologies. For example, Jeff Han has popularized a low cost multi-touch device and multi-touch interactions with his publication "Low-cost multi-touch sensing through Frustrated Total Internal Reflection", Proceeding of the 18th Annual ACM Symposium on User interface Software and Technology (Seattle, Wash., USA, Oct. 23-26, 2005). UIST '05, ACM, New York, N.Y., 115-118. Multi-touch interactions, such as the two fingers "rotate, scale and translate" gesture to move, stretch and turn objects, are now available on commercial products such as Apple® iPhone™ or Macbook Air®. But their multi-touch gesture dictionaries do not provide a gesture for all core user interface commands. For example, "cut-and-paste" is not yet associated to a de-facto standard multi-touch gesture. Thus, a careful design of a standard multi-touch gesture dictionary that includes the core set of user interface commands is an important task to help people to switch from a conventional PC (mouse and keyboard) to a multi-touch interactive surface.

Currently available mono-stroke and multi-stroke gesture recognition frameworks, such as Microsoft® Ink, can not immediately be applied to interpret multi-touch inputs because they assume the existence of a unique orientation, i.e. a single directional viewing angle. Indeed, with multi-touch, we are entering an era where people can gather around a table (side by side, face to face, etc.) and interact with the user interface from any side: hence, there is not a single directional viewing angle or orientation that is ideal for everyone around the table. Thus, gesture recognition frameworks need to be adapted to support multi-touch gestures. They particularly need to handle one of the most prominent issues that arise for multi-users systems dealing with multi-touch gesture interactions: how to distinguish between individual gestures when they are performed concurrently. It involves determining when a gesture starts, when it stops and when to interpret the input data as a collection of isolated gestures rather than a single gesture. It is primarily an issue for multi-touch devices that can not distinguish users.

While there exists a variety of multi-touch gestures recognition engine, they can only recognize isolated multi-touch gestures and none of them addresses the issue of supporting a real continuous recognition of multi-touch gestures. A continuous recognition of multi-touch gestures involves at least two prerequisites. The first one is the recognition of dynamic multi-touch gestures, i.e. the ability to dynamically update parameter values of the recognized multi-touch gesture, once it is recognized, based on tracking of contact points, e.g. when a contact point moves. The second and most important one is the ability to interpret users input data as a sequence of temporally contiguous distinct multi-touch gestures, i.e. to allow users to start interacting with one multi-gesture and subsequently perform any other multi-touch gestures, if they want it, without needing to lift all their fingers off the multi-touch input device between each multi-touch gesture. Simply put, it means that the number of contact points can be changed (increased or decreased) while a user is interacting. Current multi-touch gestures recognition engines do not fulfill the second prerequisite. For example, Apple® and Synaptics® multi-touch trackpads do not allow a user to perform a continuous sequence of different multi-touch gestures, i.e. a sequence of temporally contiguous multi-touch gestures in which the user does not lift off all his/her fingers until the end of the last multi-touch gesture. Indeed, once a multi-gesture is recognized, the user can not perform another multi-touch gesture until he/she lift off his/her fingers and put back them down on the multi-touch surface. For example, if the system recognizes a pinch gesture performed with two fingers and the user puts an additional finger down after the pinch gesture is recognized, the system will not even try to recognize any three fingers gesture: the user will have to lift its fingers off the multi-touch input device and put back them again in order to perform a new gesture.

Accordingly, one of the objects and advantages of the present invention is to provide an approach to segment a sequence of user inputs into temporally contiguous elementary multi-touch gestures and hence performing a continuous recognition of multi-touch gestures. Further objects and advantages of the present invention will become apparent from a consideration of the drawings and ensuing description.

SUMMARY OF THE INVENTION

The present invention extends to methods, systems, and computer program products for continuous recognition of multi-touch gestures. It can be used with any multi-touch device. Multi-touch refers to a system that can independently detect and optionally track the position of two or more contact points at the same time. Illustrative multi-touch devices include, but are not limited to, tables, walls or touch-pads.

At least certain embodiments of the present invention include a computer environment with applications interacting with a recognition engine to provide gesture operations in their user interfaces. The gesture operations include performing actions, such as rotation or zoom in/out, in response to user's input.

The invention relates, in another embodiment to a multi-touch gesture recognition method that can detect a plurality of gestures being performed concurrently on at least one multi-touch input device. The method also includes producing different actions for each of the gestures that have been detected.

The invention will be readily understood by the following detailed description in conjunction with the accompanying drawings.

BRIEF DESCRIPTION OF THE DRAWINGS

The accompanying drawings, which are incorporated in and constitute a part of this specification, illustrate several aspects of the invention and together with the following description serve to explain the principles of the invention. In the drawings:

FIG. 1 is a block diagram illustrating an example system configuration according to one embodiment of the invention.

FIG. 2 is a block diagram illustrating an example distributed architecture in accordance with one embodiment of the invention.

FIG. 3 is a flow diagram illustrating a multi-touch gesture processing method in accordance with one embodiment of the invention.

FIG. 4 is a block diagram illustrating the first step of the flow diagram described in FIG. 3.

FIG. 5 is a block diagram illustrating the second step of the flow diagram described in FIG. 3.

FIG. 6 is a block diagram illustrating the third step of the flow diagram described in FIG. 3.

FIG. 7 illustrates a spatial segmentation of contact points to associate each of them with an application.

FIG. 8 illustrates a filtering process of contact points based on user interface elements.

FIG. 9 illustrates a spatial filtering process of contact points.

FIG. 10 illustrates a method to control the continuum of gestures using a finite state machine.

FIG. 11 illustrates different arrangement of three contact points.

FIG. 12 illustrates a zoom gesture using two fingers.

FIG. 13 illustrates a rotation gesture using two fingers.

FIG. 14 is a flow diagram of a method to distinguish a zoom gesture from a rotation gesture in accordance to one embodiment of the invention.

FIG. 15 illustrates a multi-touch gesture performed on a user interface element displayed on two multi-touch devices at once.

FIG. 16 illustrates a multi-touch gesture performed on a user interface element displayed on two remote multi-touch devices at once.

DETAILED DESCRIPTION OF THE INVENTION

The present invention extends to methods, systems, and computer program products for continuous recognition of multi-touch gestures. Some aspects of the invention are discussed below with reference to FIGS. 1-16. However, those skilled in the art will readily appreciate that the detailed description given herein with respect to these figures is for explanatory purposes as numerous further embodiments and many alternatives ways of implementing the methods of the present invention than mentioned below are possible without departing from the inventive concepts disclosed herein. The specification and drawings are accordingly to be regarded as an illustrative sense rather than a restrictive sense.

Multi-touch devices can independently detect and optionally track the position of two or more contact points at the same time. It allows a single user to interact with several fingers and multiple users to interact and collaborate on the same display simultaneously. Its ability to have several interactions in parallel allows richer interactions, more particularly multi-touch gestures, which take user experience beyond classic touch interactions such as clicks and drag-n-drop.

Multi-touch gesture is an interaction where the system interprets several input flows as contributing to a single gesture. The gestures can be either static i.e. a given arrangement of contact points, or dynamic i.e. defined by a continuous movement of one or more contact points across the multi-touch surface. An example of static gesture is ten fingers to invoke a virtual keyboard. An example of dynamic gesture is a two fingers pinch to zoom out (see FIG. 12).

A contact point can be associated to a finger, a hand or any other parts of the body.

It should be noted that some multi-touch input devices, such as direct illumination (DI) setups, can also respond to contact and movement of physical objects. Thus, instead of interacting with his fingers or his hands, a user can interact with a physical object such as stylus, a sheet of paper or a glass. In one embodiment, the present invention can be used to interpret any gestures performed by disposing or moving physical objects across the surface of a multi-touch input device.

User interfaces that take full advantage of the multi-touch capability still need to be developed, and in particular in the field of gesture recognition. Multi-touch gestures are becoming increasingly important as a modality of interaction in addition to the more common point-and-click interactions. They are also of particular interest to designers of surface computing applications who want to provide an intuitive and natural interface to end-users.

A key element of effective gesture interaction is the ability to interact without lifting all fingers of the multi-touch surface: it allows a fluid interaction based on continuous gestures. For example, a user can start to resize an object with two fingers, then put a third finger on this object to rotate it with three fingers, lift off a finger to resize it again with two fingers and finally lift off all his/her fingers to release it.

The recognition of continuous multi-touch gestures is a challenging problem because it requires spatially and temporally segmenting the input data into a sequence of temporally contiguous multi-touch gestures. Dynamically segmenting user's input is a difficult task because is not easy to detect a transition between two distinct multi-touch gestures, i.e. knowing when a multi-touch gesture is ending or beginning. Thus, in current multi-touch recognition systems continuity at the interaction level is ignored. As a result, these systems require explicit breaks between multi-touch gestures, i.e. the user must lift off his/her fingers after each gesture before performing a new gesture.

It is a therefore a general object of the present invention to provide a method of performing continuous recognition of multi-touch gestures. Simply put, it means that, while passing through a sequence of user inputs, a subset of input data will be extracted and tested against several gesture models to determine the likelihood of a gesture. Once the likelihood exceeds a certain threshold, the corresponding gesture is spotted out and the recognition process start again.

FIG. 1 shows an exemplary system using the present invention. The system includes at least one multi-touch input device, such as table or a wall, to sense user's input. Each multi-touch input device is associated to a driver or an Application Programming Interface (API) to report data for each contact points with the multi-touch surface, such as touch event type (touch down, lift off, etc.), X and Y coordinates or a unique identifier (ID). The multi-touch gesture recognition engine (MGRE) reads input data from the multi-touch device and interprets them as multi-touch gestures. When a gesture is recognized, the recognition engine generates a gesture event. To receive these gesture events, an application must subscribe to the MGRE, i.e. attach event handlers to a set of gestures. Whenever a gesture event is triggered, the associated event handlers are called with an argument that contains data about the recognized gesture such as its name, parameters or key features.

The present invention may operate on a single computer or a networked environment, either a local area network (LAN) or a wide area network (WAN), through a network protocol such as TCP/IP or UDP. FIG. 2 illustrates an exemplary distributed architecture using the present invention. In this embodiment, the recognition process is offloaded to a dedicated server. The computing task of multi-touch gesture recognition is then performed by this server, thereby saving computer resources for other tasks such as the tracking of contact points on a FTIR setup or compute-intensive applications.

FIG. 3 illustrates a multi-touch gesture recognition process in accordance with one embodiment of the invention. The processing method begins with an acquisition block to acquire user inputs: raw data are read from a multi-touch input device. Multi-touch input devices can output various form of data according to their capabilities: list of (X, Y) coordinates, list of tracked points with a unique identifier (ID, X, Y), list of shapes, etc. Thereafter, the raw data can be transformed into a form more suitable for gesture recognition: for example, the system can convert (X, Y) coordinates into a normalized coordinate space to work with device independent coordinates, calculate a list of features (direction, size, velocity, acceleration, boundaries of touched regions, etc.) or track the position of contact points if the input device does not track them. The raw data can also be filtered to reduce noise and avoid false detection: for example, a threshold can be set to remove small contact points. In the following block, the gesture recognition is performed to find which gesture, if any, matches input data. There is no a single algorithm to perform gesture recognition: a variety of techniques or combination of techniques can be used, such as template matching, dictionary lookup, heuristic rules, discrimination nets, neural networks, etc. If the user input is recognized as a gesture input (i.e. a gesture is recognized), the system can either generate a gesture event that will be handled by one or more applications, or directly perform the action corresponding to this gesture: for example, a pinch gesture (see FIG. 12) can generate keyboard events such as "Control—" that will be interpret as a zoom out command by Google Earth®. This association can also depend on the current context of execution: the same pinch gesture can alternatively be interpreted as a zoom out command if Google Earth® is currently displayed or a command to increase the screen resolution if the desktop is displayed (i.e. no application on screen).

FIG. 4 illustrates input data acquisition. This task can be separated into two steps: reading raw input from multi-touch input devices and converting raw input data into a common format, e.g. a list of tracker points with a unique identifier and 2D coordinates (ID, X, Y). A multi-touch touch input device can be any combination of hardware, software and telecommunications. For example, an UDP client that can read TUIO ("TUIO: A Protocol for Table-Top Tangible User Interfaces", Kaltenbrunner, M. & Bovermann, T. & Bencina, R. & Costanza, E., Proceedings of the 6th International Workshop on Gesture in Human-Computer Interaction and Simulation, GW 2005) messages is a multi-touch input devices. A computer system with multiple mice connected and a software library that can provide multiple independent mouse cursors, such as Microsoft® MultiPoint SDK or the Multi-Pointer X server (MPX), is also a multi-touch input device. More generally, any tracking system, that is capable of generating data relating at least relating to a succession of absolute or relative positions of multiple objects, can be considered as a multi-touch input device. A number of such tracking systems are available to the person skilled in the art.

Multi-touch gesture-based user interfaces allow multiple gestures in parallel. For example, a user can resized two images at the same time using both hands. Thus, data input can include a single gesture or multiple gestures that occur simultaneously. One method to distinguish these two cases consists in associating each contact points to a user interface element. A user interface element can be any classic WIMP widgets (button, slider, etc.) or advanced components. If two contact points are associated with the same user interface element, they will be considered as part of the same gesture. Otherwise, they will be considered as part of two distinct gestures. This filtering technique is particularly efficient to reduce the gesture recognition to a small set of gestures which are likely for a given object of the user interface. It also allows detecting and recognizing a plurality of gestures that are concurrently performed on a multi-touch input device.

In one embodiment, the filtering technique is a two steps process, as illustrated in FIG. 5. The first step consists in finding the underneath application for each contact point. For example, in FIG. 7, contact point "1" belongs to "Application A", and contact points "3" and "4" belong to the same application, "Application B". The second step is to associate each contact points within an application to a user interface element of this application. For example in FIG. 8, contact points "2" and "3" are part of the same gesture whereas contact points "1" and "4" are part of two distinct gestures. This filtering technique allows each application and each user interface element of an application to specify its set of supported multi-touch gestures to the recognition engine. By tightly coupling applications to the multi-touch gesture recognition engine, we can reduce the gesture recognition to a small set of gestures and, hence, effectively reduce the required computer system resources (e.g. CPU cycles, memory, etc.).

Another filtering technique is to group contact points based on their spatial proximity, i.e. their relative distance. If the distance between two contact points is smaller than a threshold, they will be considered as part of the same gesture. Otherwise, they will be considered as part of two distinct gestures. For example in FIG. 9, the contact points labelled "1" to "5" can be split into three groups labelled "A", "B" and "C" based on a spatial segmentation.

In a multi-touch application, multiple different gestures can be performed on a single user interface element. For example, in a multi-touch photo sharing applications, a user can perform a pinch gesture to resize a photo or a rotate gesture to rotate it. A significant problem in gesture recognition systems, in particular for multi-touch gesture recognition, is how to accurately/reliably and speedily discriminate a gesture being made from a dataset of candidate gestures.

In one embodiment, the recognition of multi-touch gestures is preferably based on a multi-agent approach, as illustrated in FIG. 6, which enables separate gesture recognizers to work in parallel on the interpretation improving the probability of correct gesture discrimination and reducing the response time. A set of independent agents, each with its own recognition algorithms and supported gestures, analyzes the user interaction sequence to determine the likelihood of a gesture. The agents then independently determine the confidence of their respective findings and a distributed arbitration, the recognition manager, resolves the interpretation through a confidence sorting and a rejection threshold filtering. The multi-agent approach provides an effective way to solve problems which are difficult or impossible for a monolithic system to solve. It is also easily extensible to new gestures and recognition algorithms.

As explained above, a key element of effective gesture interaction is the ability to interact without lifting all fingers of the multi-touch surface, i.e. the ability to perform a continuous sequence of temporally contiguous multi-touch gestures instead of a collection of isolated gestures.

To deal with this problem, the invention proposes a gesture recognition method which considers continuity of motion and transitions between gestures to provide a more natural interaction to end-users.

In one embodiment, the continuum between gestures can be controlled by a finite state machine (FSM): for example, an FSM which states correspond to the number of contact points and transitions between these states are touch down and lift off events. FIG. 10 shows a simplified process to control the continuum between a single finger gesture (here a drag-n-drop (DND)) and a two fingers gesture (here a translation, rotation and scale (TRS) gesture) using a FSM with four states ("0", "1", "2" and "3 or more"): the current state of the FSM is linked to the number of contact points. Whenever two contact points are detected, the gesture will be interpreted as a TRS. Whenever only one contact point is detected, the gesture will be interpreted as a drag-n-drop. It should be appreciated that the FSM can be driven by many different types of events: either external events such as keyboard or network events, or internal events such a timer or previous recognition results.

In a similar vein, the continuum between gestures can be controlled by the "switch case" statement that exists in most programming language: the number of contact points is used to control the flow of gesture recognition. A number of such techniques (Petri nets, Markov models, etc.) are available to the person skilled in the art.

In another embodiment of the invention, the multi-touch gesture recognition engine may know multiple different gestures performed with the same number of contact points: for example, FIG. 11 illustrates three different static gestures that can be performed with three fingers. FIG. 12 and FIG. 13 shows two dynamic gestures performed with two fingers. FIG. 12 illustrates a pinch gesture: the user places two fingers (e.g. its thumb and its index) on the multi-touch surface and moves them closer to each other mimicking a pinch. FIG. 13 illustrates a rotation gesture: the user places two fingers (e.g. its thumb and its index) on the multi-touch surface and either turn them clockwise or counter clockwise.

FIG. 14 illustrates a process to dynamically distinguish a two finger pinch gesture from a two finger rotation gesture using a set of simple heuristic rules based on threshold values. Whenever two contact points are detected, their current positions are saved. Then, the recognition engine monitors these two contact points and calculates two key parameters, the distance and the angle between contact points, each time the position of a contact point changes. If an absolute distance variation greater than a given threshold is detected, a zoom event is triggered: a zoom in event if the distance increases and a zoom out if it decreases. If an absolute angle variation greater than a given threshold is detected, a rotation event is triggered according to direction and magnitude of roll of contact points. Whenever an event is triggered, the current positions of contact points are saved and the recognition engine starts a new recognition process. Thus, the user can perform any gesture sequences without lifting off its fingers: for example, he/she can perform a continuous zoom in gesture, a rotation gesture followed by a zoom in gesture, a zoom out gesture followed by a rotation gesture, a rotation gesture followed by two zoom in gestures, etc.

In another embodiment of the present invention, the user can perform a multi-touch gesture using two or more multi-touch input devices. The multi-touch gesture recognition engine (MGRE) acquires input data from several multi-touch input devices at the same time and groups the corresponding separately-generated sets of input data in chronological order so as to provide a single set of input data that can be interpreted in a time-coherent manner. Then, the MGRE performs a continuous recognition of multi-touch gestures, as if they were only one big multi-touch input device. For example, FIG. 15 illustrates a two fingers stretch gesture performed on a graphical object shared by two multi-touch input devices (device A and device B). The user places one finger on the multi-touch device A (point "1") and one finger on the multi-touch device B (point"2"), preferably using both hands to interact. Then, the user moves them apart from each other to stretch the graphical object. This stretch gesture can also be performed by two users interacting at the same time.

In another arrangement, as illustrated in FIG. 16, multi-touch gestures can be performed on a graphical object shared between two remote multi-touch input devices operatively connected using a network connection protocol such as TCP/

IP or UDP. In this embodiment, the present invention can be used to recognize collaborative multi-touch gestures performed by at least two users, remote from each other, at the same time. For example, a two finger stretch gesture can be performed by two users moving one finger on a shared graphical object. By means of this embodiment, at least two users, remote from each other, can quickly interact with the same objects and data through multi-touch gestures, as if they were within the same room and using the same multi-touch input device. It can be used in a variety of scenarii from remote collaboration working group to gaming or fleet management.

The various embodiments of the invention can be used separately or in any combination.

The present invention has been described in the context of preferred embodiments, and for various ones of those embodiments a number of variations and examples thereof. It is to be understood that not every embodiment of the invention has been described. Those of skill in the art will appreciate that variations and modifications may be made without departing from the scope and spirit of the appended claims. Therefore, it is attended that the appended claims be interpreted as including the embodiments described herein, the alternatives mentioned above, and all equivalents thereto.

What is claimed is:

1. A computer implemented multi-touch (MT) gesture recognition (GR) method comprising the steps of:
    acquiring (1), at a processor, input data from a multi-touch input device;
    filtering, by the processor, input data and calculating (2) meaningful features for gesture recognition;
    performing, by the processor, a continuous recognition (3) of multi-touch gestures that allows users to start interacting with one multi-gesture and subsequently perform any other multi-touch gestures, if they want it, without needing to lift all their fingers off the multi-touch input device between each multi-touch gesture;
    performing, by the processor, at least one action (4.a, 4.b) during the user interaction sequence when a subset of input data is classified as a gesture;
    wherein said filtering input data step comprises a spatial segmentation method defined by the steps of:
        finding the underneath application for each contact point (2.A),
        associating (2.B) each contact points within an application to a user interface element of this application, and
        reducing the gesture recognition to a small set of gestures which are expected for this user interface element.

2. The method of claim 1, wherein said multi-touch input device can be any combination of hardware, software and telecommunications.

3. The method of claim 1, wherein input data is at least a list of contact points on said multi-touch input device.

4. The method of claim 3, wherein a contact point can be a physical object, a finger, or any human body parts.

5. The method as recited in claim 1, wherein said action consists in controlling a change in the user interface in accordance with the recognized gesture and its related features.

6. The method as recited in claim 1, wherein said action consists in providing a user feedback about the recognized gesture.

7. The method as recited in claim 1, wherein said action is the conjunction of a user feedback, a change made to the user interface and an application specific action.

8. The method as recited in claim 1, wherein said action is a backward compatibility module that interprets the recognized gesture as a command, convert the command to an equivalent sequence of mouse and/or keyboard events (mouse click, mouse move, key pressed, etc.) and sends these events to the underneath application as virtual mouse and/or keyboard events.

9. A computer implemented multi-touch (MT) gesture recognition (GR) method comprising the steps of:
    Acquiring, at a processor, input data from at least two multi-touch input devices;
    grouping, by the processor, corresponding separately-generated sets of input data in chronological order so as to provide a single set of input data that can be interpreted in a time-coherent manner;
    filtering, by the processor, said single set of time-aligned input data and calculating meaningful features for gesture recognition;
    performing, by the processor, a continuous recognition of multi-touch gestures that allows users to start interacting with one multi-gesture and subsequently perform any other multi-touch gestures, if they want it, without needing to lift all their fingers off the multi-touch input device between each multi-touch gesture;
    performing, by the processor, at least one action during the user interaction sequence when a subset of input data is classified as a gesture;
    wherein said filtering input data step comprises a spatial segmentation method defined by the steps of:
        finding the underneath application for each contact point (2.A),
        associating (2.B) each contact points within an application to a user interface element of this application, and
        reducing the gesture recognition to a small set of gestures which are expected for this user interface element.

10. The method of claim 9, wherein said multi-touch input device can be any combination of hardware, software and telecommunications.

11. The method of claim 9, wherein input data is at least a list of contact points on said multi-touch input device.

12. The method of claim 11, wherein a contact point can be a physical object, a finger, or any human body parts.

13. The method as recited in claim 9, wherein said action consists in controlling a change in the user interface in accordance with the recognized gesture and its related features.

14. The method as recited in claim 9, wherein said action consists in providing a user feedback about the recognized gesture.

15. The method as recited in claim 9, wherein said action is the conjunction of a user feedback, a change made to the user interface and an application specific action.

16. The method as recited in claim 9, wherein said action is a backward compatibility module that interprets the recognized gesture as a command, convert the command to an equivalent sequence of mouse and/or keyboard events (mouse click, mouse move, key pressed, etc.) and sends these events to the underneath application as virtual mouse and/or keyboard events.

17. The method as recited in claim 9, wherein said multi-touch gesture is performed using at least two multi-touch input devices.

18. The method as recited in claim 17, wherein said multi-touch gesture is performed by at least two users.

19. The method as recited in claim 18, wherein said multi-touch input devices are remote from each other and operatively connected using a network connection.

20. The method as recited in claim 19, wherein said application is a remote collaboration tool such as a shared workspace.

21. The method as recited in claim 19, wherein said application is a video game.

22. In a computer system having a multi-touch screen and a processor, the computer system being constructed and arranged to (i) recognize and respond to a plurality of contact gestures on the multi-touch screen and (ii) concurrently display a plurality of software applications including a first software application and a second software application in separate areas of a surface of the multi-touch screen, the first software application being constructed and arranged to only utilize a first subset of the plurality of contact gestures, the second software application being constructed and arranged to only utilize a second subset of the plurality of contact gestures, the first subset being different than the second subset, a multi-touch gesture recognition method comprising:

acquiring, at the processor, input data from the multi-touch screen, the input data indicating current points of contact from a user on the surface of the multi-touch screen;

associating, by the processor, each current point of contact with a particular software application of the plurality of software applications located at that current point of contact, for current points of contact associated with the first software application, performing, by the processor, a continuous recognition of only the first subset of the plurality of contact gestures; and for current points of contact associated with the second software application, performing, by the processor, a continuous recognition of only the second subset of the plurality of contact gestures;

wherein the continuous recognition of only the first subset of the plurality of contact gestures includes recognizing successive gestures without the user ceasing contact with the surface of the multi-touch screen;

wherein the continuous recognition of only the second subset of the plurality of contact gestures includes recognizing successive gestures without the user ceasing contact with the surface of the multi-touch screen.

* * * * *